United States Patent [19]
Cherrington

[11] Patent Number: 5,979,508
[45] Date of Patent: Nov. 9, 1999

[54] PIPE PROTECTOR

[75] Inventor: William Cherrington, New South Wales, Australia

[73] Assignee: Cherrington (Australia) PTY. Ltd., Australia

[21] Appl. No.: 08/717,692

[22] Filed: Sep. 23, 1996

[30] Foreign Application Priority Data

Sep. 22, 1995 [AU] Australia ................................. PN5590

[51] Int. Cl.⁶ ..................................................... F16L 55/00
[52] U.S. Cl. .......................... 138/108; 138/110; 138/112
[58] Field of Search ................................... 138/110, 108, 138/112, 113; 175/81, 82, 171, 257, 325.1, 325.5

[56] References Cited

U.S. PATENT DOCUMENTS

| | | |
|---|---|---|
| 2,153,787 | 4/1939 | Anderson ................................. 138/108 |
| 2,308,147 | 1/1943 | Ballagh ................................... 138/110 |
| 2,793,917 | 5/1957 | Ward ................................... 138/108 X |
| 3,294,122 | 12/1966 | Sharp ....................................... 138/110 |
| 3,417,785 | 12/1968 | Andrews ................................. 138/108 |
| 3,742,985 | 7/1973 | Rubenstein ............................. 138/176 |
| 3,891,006 | 6/1975 | Lee ......................................... 138/112 |
| 4,436,118 | 3/1984 | Garrett .................................... 138/109 |
| 4,679,637 | 7/1987 | Cherrington et al. . |
| 4,784,230 | 11/1988 | Cherrington et al. . |
| 4,785,885 | 11/1988 | Cherrington et al. . |
| 4,796,670 | 1/1989 | Russell et al. ........................... 138/108 |
| 5,069,255 | 12/1991 | Muszynski .............................. 138/110 |
| 5,592,975 | 1/1997 | Wissmann et al. ..................... 138/112 |
| 5,803,127 | 9/1998 | Rains ...................................... 138/113 |

*Primary Examiner*—James F. Hook
*Attorney, Agent, or Firm*—Ostrolenk, Faber, Gerb & Soffen, LLP

[57] ABSTRACT

The present invention relates to protectors used to prevent piping or tubing from touching the surface of a bore hole, and in particular is related to discrete pipe coating protectors for in situ mounting on a product carrying pipe line or tubing to be received within an underground bore or within another pipe.

16 Claims, 3 Drawing Sheets

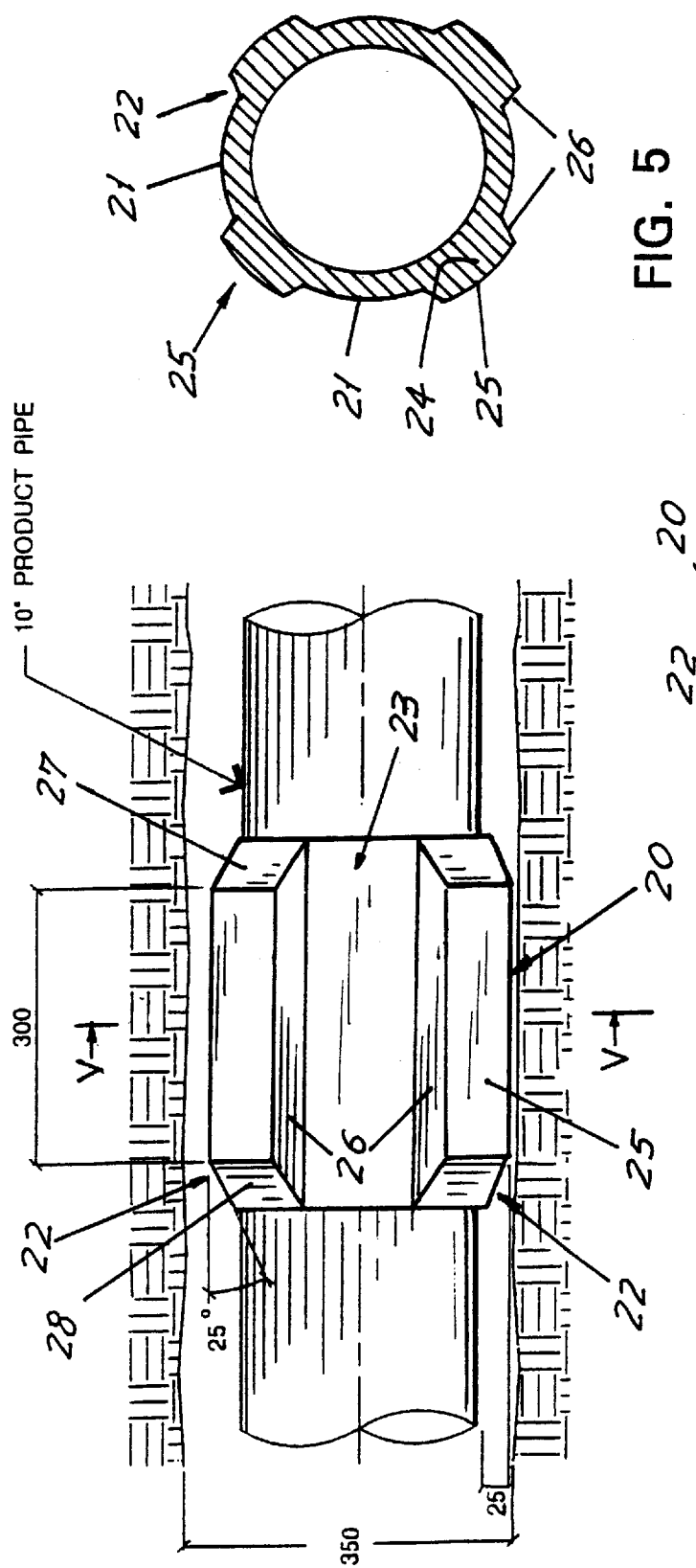
FIG. 3
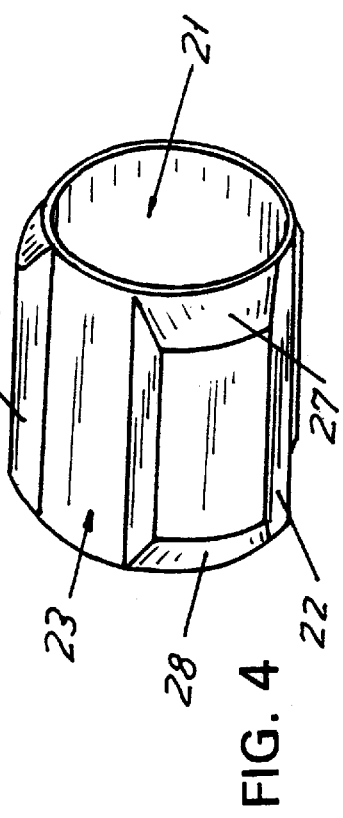
FIG. 4
FIG. 5

PIPE PROTECTOR

DESCRIPTION

1. Technical Field

The present invention relates to protectors used to prevent pipes or tubing from touching the surface of a bore hole, and in particular is related to discrete pipe coating protectors for in situ mounting on a product carrying pipe or tubing line to be received within an underground bore or within another pipe.

2. Background Art

There are known methods and apparatus for simultaneously drilling a bore hole along an underground arcuate or straight path between two surface locations to by-pass an obstacle thereinbetween and embedding a product pipe or tubing line in the bore hole. First, a drill string having a drill bit at the driving or frontal end of the string is used to create a pilot bore and a reamer is used to enlarge the pilot bore; the reamer can either be arranged on the drill string a distance behind the drill bit or mounted onto the drill string after the pilot bore has been completely drilled; the terminal front end of the product pipe is either secured directly behind the reamer or at a terminal end of the drill string by means of, i.e., a pull-back swivel carrying a pull head; the pipe line is then moved and embedded into the bore hole created by the drill bit and reamer, either during or at the end of the drilling operation by pulling out the drill string at the opposite end of the bore hole. Such a method is the subject of U.S. Pat. No. 4,679,637 granted to Cherrington et al.

While other methods are also practised, the above method has the advantage of allowing drilling of a bore and placing of a product pipe or tubing line in one same operation.

The pipe lines embedded in such horizontal and arcuate bores, which provide surface to surface conduits under obstacles such as rivers, lakes, mountains and the like, are either directly used for transporting or conveying fluids including water, gas, oil production and the like, or to accommodate cables for electricity supply, telephone and other purposes. The embedded pipeline is subjected to environmental conditions which may eventually degrade the pipe and render them useless. Thus, many pipes used nowadays for such purposes are made of materials which are resistant to environmental agents, i.e. PVC-pipes, and/or, in the case of metallic pipes, are coated on the outside surface with a protective coating material, such as polyurethane (PU), polyethylene (PE) and the like.

Accordingly, it is important that the outer surface and/or coating of the product carrying pipe be not damaged when pulled into and through the bore hole during the embedding procedure. Such damage will occur more readily within rough bore holes surfaces where sediment materials are hard and non-homogenous and thus provide a rugged surface along which the product pipe is dragged during the emplacement operation. This same considerations apply where a smaller diameter pipe line is to be embedded into a larger diameter pipe line when the latter is no longer useable due to possible damage it may have sustained. The large diameter pipe may also be a casing which has been installed in the bore hole for receiving the actual pipe line.

One approach taken to prevent pipe coating damage has been to provide a second coating or protection layer on the outer pipe surface over the coating. The second coating layer is made of a material such as cement or Epoxy, and has a thickness sufficient to ensure that no damage will be sustained by the pipe coating located underneath the protective coating. One disadvantage has to be seen in that the protection layer, which is uniformly applied over the entire length of the pipe tubing greatly increases tubing weight and costs and, thus, the power required to pull the drill string through the bore hole; this increases the tubing and installation costs by a substantial factor.

Another approach has been to cast cement into the bore hole receiving the pipeline so as to fill the annular gap between pipe and bore hole during the embedding operation; the drill string dragging the pipeline is moved through the bore hole while the cement is being filled in. This method is also known as slip forming or continuous protective layer casting. While the cement fills the annular gap between bore and pipe surfaces, thus, it does not prevent the pipe coating coming into contact with the bore surface; furthermore, considerable expenditure is required, both as to material costs and process technology to embed the pipe in the bore hole.

SUMMARY OF THE INVENTION

It is an object of the present invention to provide an alternative to the known methods and devices for protecting the outer coating of a product pipe or tubing line during emplacement in a bore hole, and in particular in bore holes along an underground arcuate path between two surface locations.

Accordingly, in a first aspect, the present invention provides a pipe protector for product pipes to be embedded in a bore hole, the protector comprising an integral, sleeve like body moulded in situ onto and preferably entirely surrounding the circumferential outer surface of a discrete length of the pipe, the body being made of an abrasion resistant, castable material which in a cured state provides a substantially rigid, noncompressible casing of predetermined thickness which is firmly bonded to the outer surface of the discrete length of pipe.

As used herein, the expression "product pipe" should be understood to encompass pipelines and tubing lines, which are either assembled from a plurality of discrete pipe or tube element or from continuous material, and pipe or tube element or from continuous material, and which are used as a tubular casing for lines or to convey fluids between two points. The bore hole can extend between two surface points, between a surface and an underground location, or between sub-surface locations. The product pipe may be a metallic one, made of plastics or other materials. The product pipes for which the pipe protector is primarily intended have no retention means integrally formed therewith, such as flanges or annular grooves on their outer surface, which could provide axial retention means to prevent slippage of the protector; thus, it is understood that the adhesion and a keying effect provided by irregularities and surface roughness of the otherwise plane surface of the product pipe or its protective coating with the material of the protector ensures that the latter is maintained in an axially and rotationally fixed manner on the pipe and withstands shearing forces exerted during the process of emplacing the pipe or tubing line within the bore. It is to be understood that when emplacing a pipeline, a plurality of pipe protectors are to be arranged (moulded) with predetermined distance from one another along the length of such pipeline. While the protectors are principally intended for pipes which are to be embedded in horizontal or inclined bores, they can also be used for pipes that are to be emplaced in substantially vertical bores where it is necessary to prevent surface contact between bore or bore casing pipe and pipe.

A material for the protector which currently is understood to be suitable to co-act with a polyethylenecoated metal pipe used to convey fluid, i.e. liquid gas, and ensure proper "coupling" between the protector and the pipe coating is an acrylic modified resilient polyester resin blended with graded silica to form a pourable paste which is catalysed by the addition of a benzoyl peroxide dispersion. Such a resin is offered under the trade name Scotec GS 140995A. The protector material can also be reinforced with suitable abrasion resistant fillers.

Preferably, the sleeve-like body is cylindrical in cross-section and is provided with a plurality of axially extending grooves on the outer circumferential surface of the body, the flutes being angularly spaced from one another around the periphery of the body.

Alternatively, the sleeve-like body comprises a hollow-cylindrical base section and a plurality of axially extending ribs integrally formed with and radially protruding from the outer surface of the hollow-cylindrical base section, the ribs being arranged with angular distance from one another around the periphery of the body. The flutes formed between the ribs are designed so as to allow fluid passage along the outer surface of the product pipe when received in the bore. This is important for applications in which the bore drilling and product pipe embedding operations are carried out simultaneously and fluids used to cool/lubricate the drill bit and reamer have to be removed through the anular gap formed between the product pipe (or tubing) and bore surface past the pipe protectors.

The integral ribs may advantageously be shaped as regular trapeziae in cross-section, that is be prismatic protrusions, with an arc-shaped base and outer peripheral surface, and if desired have on the outer peripheral surface a plurality of small, axially extending grooves. It is to be noted that by reducing the actual surface of the protector which will come into contact with the bore surface, frictional resistance will be minimised during the emplacement procedure in which substantial drag forces are exerted on the pipe or tubing line.

In order to facilitate the tubing or pipeline emplacement procedure, it is also advantageous for the sleeve-like body to have a chamfered terminal frontal end face, that is the annular front end surface and/or the front end surfaces of the ribs are inclined in backward direction, as the case may be.

While the sleeve-like body of the protector need not have a uniform wall thickness in circumferential direction, the sleeve-like body is preferably symmetrical in cross-section, such that the pipe can be emplaced substantially centralised within the bore hole and a pipeline section extending between two spaced apart protectors, which section is subject to bending between two support locations, maintains sufficient distance to the bore hole surface. The wall thickness of the cylindrical base section is determined such as to prevent cracking thereof under the loads applied during the insertion and emplacement procedure.

In a further aspect, there is provided a method for emplacing a pipe or tubing line in a bore hole or bore hole casing along an underground path between two surface or sub-surface locations, wherein a plurality of discrete pipe protectors as hereinbefore described are moulded in situ and with predetermined distance from one another onto and surrounding the circumferential outer surface of the pipe at predetermined locations of the pipeline, each protector being cast from an abrasion resistant curable material using a mould adapted to releasably and sealingly encase a volume corresponding to the shape of the protector over the circumferential surface of the respective discrete length of pipe, and wherein the pipe is moved into the bore upon the protectors being cured and the moulds removed.

The casting technology for moulding the protectors onto the discrete lengths of pipe or tubing line is conventional and may include use of a two-piece fibreglass mould having mould halfs hingedly connected with one another and adapted to be closed over the circumference of the pipe or tubing line at predetermined protector locations.

In yet another aspect of the invention, there is provided a method for protecting the outer coating of a pipe or tubing to be emplaced in a bore hole or bore hole casing, which may extend along an underground arcuate path under an obstacle between two surface or sub-surface locations, wherein a plurality of discrete pipe protectors as herein before described are moulded with predetermined distance from one another at predetermined locations onto and surrounding the circumferential outer surface of the pipeline, each protector being cast from an abrasion resistant curable material using a mould adapted to releasably and sealingly encase a volume corresponding to the shape of the protector at said predetermined locations over the circumferential surface of respective discrete lengths of pipe where the protectors are to be moulded.

A contact enhancement layer may be applied between the outer coating of the product pipe and the inner-circumferential surface of the sleeve-like body of the protector such as to promote bonding action between the protector and the coating of the product pipe.

The present invention, in its different aspects, as well as further advantages thereof, will be more fully understood from the ensuing description of a preferred embodiment thereof which is provided with reference to the accompanying drawings.

BRIEF DESCRIPTION OF THE DRAWINGS

FIG. 3 is a part side elevation of a product pipe onto to which is mounted a pipe coating protector in accordance with the invention as emplaced in a bore hole;

FIG. 4 is an isometric view of the pipe coating protector illustrated in FIGS. 2 and 3;

FIG. 5 is a cross-section taken along lines V—V of FIG. 3.

PREFERRED MODE FOR CARRYING OUT THE INVENTION

Figure 1:
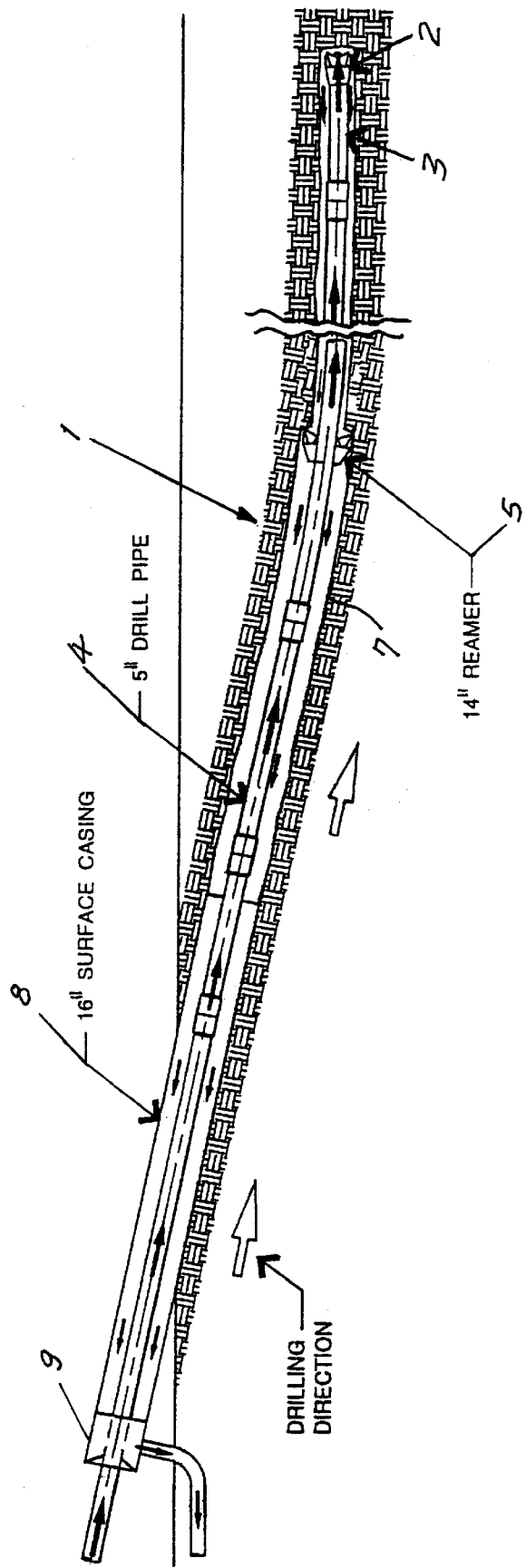
FIG. 1 is a schematic illustration of a drill string used to excavate a drilling hole along an arcuate path underneath the surface to provide a channel underneath an obstacle between two surface locations.
Figure 2:
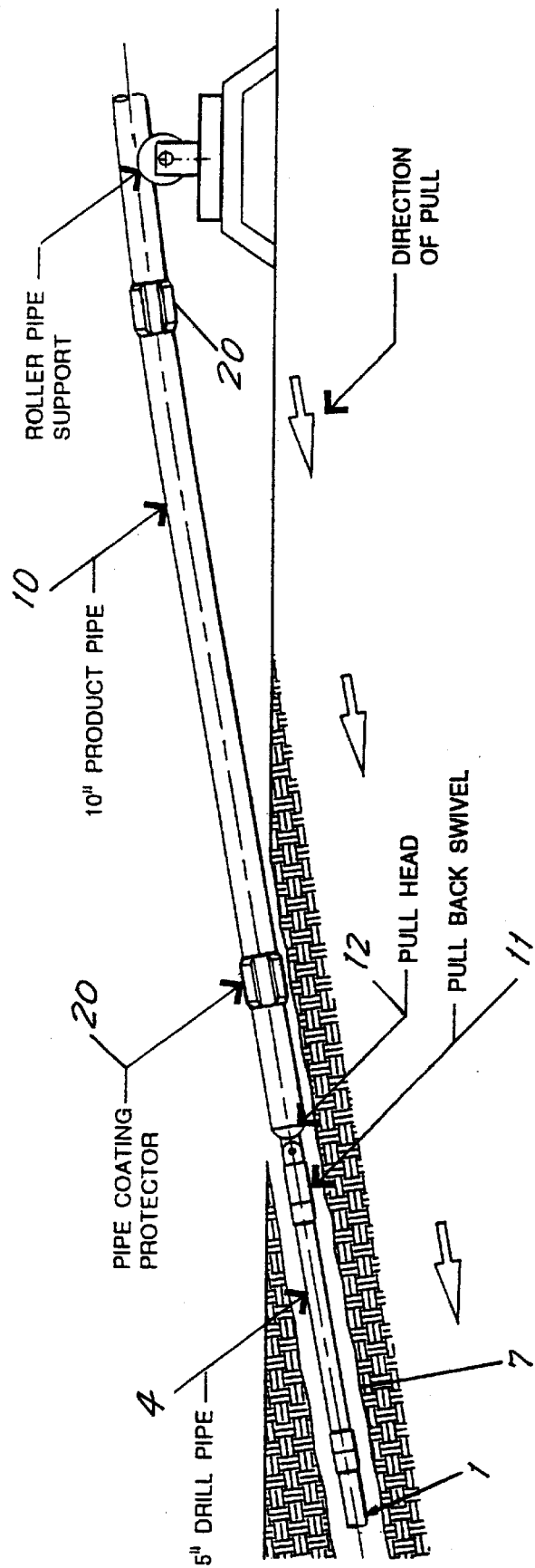
FIG. 2 is a schematic illustration of the rear end of a drill string carrying a pull head to which is connected the terminal end of a product pipe or tubing line to be emplaced within the arcuate path bore hole the pipe line being provided with a plurality of pipe protectors in accordance with the invention.

In FIG. 1 is illustrated in a highly schematic and simplified way a drill string 1 used to drill a bore hole along an arcuate path underneath an obstacle, such as a river, between two surface points. The drill string 1 comprises at its frontal driving end a roller cone bit 2 with mud motor 3 for drilling a pilot bore. In backward direction along the drill pipe 4 of the drill string 1 is located a reamer 5 used to enlarge the bore diameter to the final size of the bore hole 7. In further rearward extension, the drill string 1 passes through a cooling fluid collector manifold 9 arranged at the terminal end of a surface casing 8 inserted into the bore hole opening. Such an apparatus and a method for drilling an underground arcuate path bore hole between two surface locations and the subsequent procedure for emplacing a product tube or pipeline is known for example from a number of US Patents granted to Cherrington et al, for example U.S. Pat. N0. 4,679,637, the contents of which is incorporated herein by way of short hand cross-reference. While said US patent discloses to first complete the pilot bore hole and subsequently connect the reamer t o the drill string to enlarge the bore diameter, this operation can also be accomplished in one passing of the drill string. As can be seen from the schematic illustration of accompanying FIG. 2, the product pipe or tubing line 10 to be emplaced in the enlarged bore hole 7 is not mounted directly behind the reamer, but is instead fixed at the rearward most of the drill pipes 4 of the drill string 1 by means of a pull-back swivel 11 and pull-head 12 mechanism. The drill string 1 pulls the product pipe 10 into the enlarged diameter bore hole 7 either upon completion of the enlarged bore hole or while the bore is still being drilled. The product pipe 10 is provided at predetermined length intervals with discrete, sleeve-like cylindrical pipe coating protector elements 20. The pipe coating protectors 20 are used to ensure that the relatively scratch-sensitive PE-coating of the stainless steel product pipe 10 does not come in touch with the bore hole surface during the pulling and embedding operation.

FIG. 3 and 4 illustrate such a pipe coating protector in more detail. As can be seen there, the protector 20 comprises a hollow cylindrical base section 21, the circumferential wall of which has a relatively small thickness. A total of four axially extending ribs 22 are integrally formed with the base section 21 and arranged equi-distantly around the circumference of the protector body 20; the ribs 22 thereby form thereinbetween extending flutes 23. As best seen in FIGS. 3 and 5, the cross-section of the ribs 22 is that of a regular trapezium with an arc-shaped base 24 and arc-shaped outer peripheral surface 25 as well as inclined side surfaces 26. The front and rear terminal end surfaces 27 and 28 of the ribs 22 are also chamfered with a predetermined angle, which in the specifically shown example is 25 with respect to the horizontal plane. While not illustrated, the outer peripheral surface 25 may have a plurality of small, axially extending grooves. By way of example only, when designed for use with a 10" diameter product pipe, which is to be located in a bore hole of about 350 mm diameter, the height of the ribs 22 from the outer surface of the cylindrical base section 21 is about 25 mm, the thickness of the cylindrical base section 21 is also approximately 25 mm. It is of course also possible to have other thickness ratios. The overall length of the protector body 20 is about 350 mm. It is to be understood that the specifically illustrated cross-section of the pipe protector body 20 and its dimensions are examples only which are not to be interpreted as limiting the protector shape to the one specifically illustrated. For example, the number of ribs 22 can be increased, and the specific cross-section altered.

The protector body 20 is cast in situ onto a desired one of a plurality of locations along the length of the product pipe 10 using conventional casting techniques for curable materials. Herefore, a two-piece mould can be used, having an interior surface contoured such as to provide the outer shape of the pipe protector body 20 when arranged at the predetermined location on the product pipe and closed such as to sealingly encircle a volume zone over a discreet length of the surface of the product pipe. A typical distance between neighbouring protection is 7–10 m.

The material used for casting the pipe coating protector bodies 20 is chosen such as to be compatible with the outer protective coating of the product pipe and ensure proper adhesion and inter-keying with the minute surfaces irregularities present in such product pipes. The bond between the inner surface of the hollow cylindrical base section 21 of the pipe coating protector body 20 and the pipe coating ensures that the pipe coating protector 20 is fixed against rotation and axial movement along the product pipe. That is, any type of gliding between the pipe coating protector 20 and the product pipe type 10 is inhibited.

The pipe protector material has also to be chosen taking into consideration the type of soil/strata into which the tubing is to be emplaced. One pipe protector material suitable for a PE-coated pipe to be embedded in a bore hole in a sand stone formation is mentioned above.

One of the main features of the pipe coating protector according to the present invention is that it requires no additional mechanical fasteners or fastening devices to be fixed onto the product pipe and that it provides a one-piece element which can be said to be integrated with the product pipe as a result of being produced by cast moulding onto the outer surface of the product pipe.

While the specific shape of the pipe coating protector body 20 described and illustrated herein constitutes one preferred embodiment of the invention, as does the above described method for emplacing a product pipe or tubing line having a plurality of such pipe coating protectors arranged at spaced intervals along the length of the pipe line or tubing, it is to be understood that the invention is not limited to these precise forms and that changes may be made without departing from the scope of the invention as set forth in the claims.

I claim:

1. A pipe protector for product pipes to be embedded in a bore hole or bore hole casing, the protector comprising an integral, sleeve-like body moulded in situ onto a circumferential outer surface of a discrete length of the pipe, the body being made of an abrasion resistant, castable material which in a cured state provides a substantially rigid, non-compressible casing of predetermined thickness which is firmly bonded to the outer surface of the discrete length of pipe, wherein the castable material of the protector is adapted to protect a polyethylene-coated metal pipe used to convey liquid gas, the castable material containing an acrylic modified polyester resin blended with graded silica to form a pourable paste which is catalysed by the addition of a benzoyl peroxide dispersion.

2. A pipe protector according to claim 1, wherein the sleeve-like body completely surrounds the pipe.

3. A pipe protector according to claim 1, wherein the sleeve-like body is cylindrical in cross-section and is provided with a plurality of axially extending grooves on an outer circumferential surface of the body, the grooves being angularly spaced from one another around the periphery of the body.

4. A pipe protector according to claim 1, wherein the sleeve-like body has a terminal end face which is chamfered.

5. A protector according to claim 1, wherein a contact enhancement layer is applied between the outer coating of the product pipe and an inner-circumferential surface of the sleeve-like body of the protector, the contact enhancement layer arranged to promote bonding action between the protector and the coating of the product pipe.

6. A method for emplacing a pipe or tubing line in a bore hole or bore hole casing along an underground path between two surface or sub-surface locations, wherein a plurality of discrete pipe protectors according to claim 1 are moulded in situ and with predetermined distance from one another onto and preferably surrounding the circumferential outer surface of the pipe at predetermined locations of the pipeline, each protector being cast from the abrasion resistant curable material using a mould adapted to releasably and sealingly encase a volume corresponding to the shape of the protector over the circumferential outer surface of the respective discrete length of pipe, and wherein the pipe is moved into the bore or casing upon the protectors being cured and the mould removed.

7. A method according to claim 6, wherein a contact enhancement layer is applied between the outer coating of the product pipe and the inner-circumferential surface of the sleeve-like body of the protector to promote bonding action between the protector and the coating of the product pipe.

8. A method for protecting the outer coating of a pipe or tubing for emplacement in a bore hole or bore hole casing, the pipe or tubing, when emplaced, extending along an underground path between two surface locations two sub-surface locations, or a surface and a sub-surface location, wherein a plurality of discrete pipe protectors in accordance with claim 1, are moulded with predetermined distance from one another at predetermined locations onto and surrounding the circumferential outer surface of the pipe, each protector being cast from the abrasion resistant curable material using a mould adapted to releasably and sealingly encase a volume corresponding to the shape of the protector at said predetermined locations over the circumferential outer surface of respective discrete lengths of pipe where the protectors are to be moulded.

9. A method according to claim 8, wherein a contact enhancement layer is applied between the outer coating of the product pipe and the inner-circumferential surface of the sleeve-like body of the protector to promote bonding action between the protector and the coating of the product pipe.

10. A pipe protector according to claim 1, wherein the sleeve-like body comprises a hollow-cylindrical base section and a plurality of axially extending ribs integrally formed with and radially protruding from an outer surface of the hollow-cylindrical base section, the ribs being arranged with angular distance from one another around the periphery of the body.

11. A method for emplacing a pipe or tubing line in a bore hole or bore hole casing along an underground path between two surface or sub-surface locations, wherein a plurality of discrete pipe protectors according to claim 10 are moulded in situ and with predetermined distance from one another onto and preferably surrounding the circumferential outer surface of the pipe at predetermined locations of the pipeline, each protector being cast from the abrasion resistant curable material using a mould adapted to releasably and sealingly encase a volume corresponding to the shape of the protector over the circumferential outer surface of the respective discrete length of pipe, and wherein the pipe is moved into the bore or casing upon the protectors being cured and the mould removed.

12. A method according to claim 11, wherein a contact enhancement layer is applied between the outer coating of the product pipe and the inner-circumferential surface of the sleeve-like body of the protector to promote bonding action between the protector and the coating of the product pipe.

13. A method for protecting the outer coating of a pipe or tubing for emplacement in a bore hole or bore hole casing, the pipe or tubing, when emplaced, extending along an underground path between two surface locations two sub-surface locations, or a surface and a sub-surface location, wherein a plurality of discrete pipe protectors in accordance with claim 10 are moulded with predetermined distance from one another at predetermined locations onto and surrounding the circumferential outer surface of the pipe, each protector being cast from the abrasion resistant curable material using a mould adapted to releasably and sealingly encase a volume corresponding to the shape of the protector at said predetermined locations over the circumferential outer surface of respective discrete lengths of pipe where the protectors are to be moulded.

14. A method according to claim 13, wherein a contact enhancement layer is applied between the outer coating of the product pipe and the inner-circumferential surface of the sleeve-like body of the protector to promote bonding action between the protector and the coating of the product pipe.

15. A pipe protector according to claim 10, wherein the integral ribs are shaped as regular trapeziae in cross-section and are prismatic protrusions, with an arc-shaped base and outer peripheral surface.

16. A pipe protector according to claim 15, wherein end surfaces of the ribs are inclined in a backward direction.

* * * * *